United States Patent
Kim (10) Patent No.: US 7,447,338 B2
(45) Date of Patent: Nov. 4, 2008

(54) METHOD AND SYSTEM FOR FACE DETECTION USING PATTERN CLASSIFIER

(75) Inventor: Tae-kyun Kim, Yongin (KR)

(73) Assignee: Samsung Electronics Co., Ltd., Suwon, Kyungki-Do (KR)

(*) Notice: Subject to any disclaimer, the term of this patent is extended or adjusted under 35 U.S.C. 154(b) by 1032 days.

(21) Appl. No.: 10/621,356

(22) Filed: Jul. 18, 2003

(65) Prior Publication Data
US 2004/0022442 A1 Feb. 5, 2004

(30) Foreign Application Priority Data
Jul. 19, 2002 (KR) .............................. 2002-42486

(51) Int. Cl.
*G06K 9/00* (2006.01)
(52) U.S. Cl. ........................ 382/118; 382/159; 382/224
(58) Field of Classification Search ................. 382/118, 382/159, 224
See application file for complete search history.

(56) References Cited

U.S. PATENT DOCUMENTS 6,944,319 B1 * 9/2005 Huang et al. ................. 382/118

OTHER PUBLICATIONS

Sung et al., Example-Based Learning for View-Based Human Face Detection, 1998, IEEE, pp. 39-51.*
G.A. Mota et al., "Face Detector Combining Eigenfaces, Neural Network and Bootstrap", Sixth Brazilian Symposium on Neural Networks, vol. 1, Nov. 22, 2000, pp. 290.

S. Gong et al., "Dynamic Vision: from Images to Face Recognition", Imperial College Press, London, Great Britain, 2000, pp. 81-102, 176, and 297-298.

(Continued)

*Primary Examiner*—Matthew C. Bella
*Assistant Examiner*—John B Strege
(74) *Attorney, Agent, or Firm*—Buchanan Ingersoll & Rooney PC (57) ABSTRACT

A system and method for detecting a face using a pattern classifier learning face images and near face images are provided. The system includes a basis vector extractor, which receives a plurality of face images and a plurality of near-face images and extracts a plurality of face basis vectors expressing the face images and a plurality of near-face basis vectors expressing the near-face images; a feature vector extractor, which extracts face feature vectors and near-face feature vectors by projecting the face images and the near-face images upon the face and near-face feature vectors and projects an image, which is input for face detection, upon the basis vectors to extract the feature vector of the input image; a clustering unit, which classifies the face feature vectors and the near-face feature vectors into predetermined sub-classes and outputs a sub-class number of a sub-class including the feature vector of the input image among the sub-classes; a pattern classifier trainer, which trains each pattern classifier corresponding to a certain sub-class using face feature vectors and near-face feature vectors, which are included in the sub-class; and a face determiner, which applies the feature vector of the input image to the pattern classifier corresponding to the sub-class including the feature vector of the input image and determines whether the input image is a face image using the pattern classifier.

18 Claims, 10 Drawing Sheets

OTHER PUBLICATIONS

Marian S. Bartlett, "Face Image Analysis by Unsupervised Learning", Kluwer, Norwell, MA, 2001, pp. 117-119, 47-48, and VII-IX.

Yuan Qi et al., "Hybrid Independent Component Analysis and Support Vector Machine Learning Scheme for Face Detection", IEEE International Conference on Acoustics, Speech, and Signal Processing, May 7, 2001, vol. 3 of 6, New York, NY, pp. 1481-1484.

Sergios Theodoridis et al., "Pattern Recognition", Academic Press, 1999, San Diego, CA, pp. 351-354.

Lingmin Meng et al., "Two Subspace Methods to Discriminate Faces and Clutters", 7th IEEE International Conference on Image Processing, vol. 100, Sep. 10, 2000, pp. 215-218.

R. K. Singh et al., "Background Learning for Robust Face Recognition", IEEE Comput. Soc., vol. 3, Aug. 11, 2002, pp. 525-528.

Baback Moghadden et al., "Probabilistic Visual Learning for Object Representation", IEEE Transactions on Pattern Analysis and Machine Intelligence, vol. 19, No. 7, pp. 696-710, 1997.

European Patent Office Search Report, 2005.

* cited by examiner

METHOD AND SYSTEM FOR FACE DETECTION USING PATTERN CLASSIFIER

CROSS-REFERENCE TO RELATED APPLICATIONS

This application claims the priority of Korean Patent Application No. 2002-42486, filed Jul. 19, 2002, which is incorporated herein in its entirety by reference.

BACKGROUND OF THE INVENTION

1. Field of the Invention

The present invention relates to a method and system for face detection, and more particularly, to a method and system for detecting a face using a pattern classifier, which previously learned from the face images and near-face images.

2. Description of the Related Art

Face detection is not only used as a first step required in face recognition systems, but also used in various applications such as intelligent human-computer interfaces, video monitoring systems, and content-based image search and retrieval by using a face. Although research on face detection has recently increased a lot, the reliability and speed of face detection algorithms is so low that the technology is practically unused.

To solve these problems, methods using a decision boundary learned from a face sample pattern in detecting a face have been investigated. Representative methods are methods using multi layer perception (MLP) and methods using support vector machine (SVM).

In one conventional approach for MLP, a local receptive field is applied to a face image. In the conventional approach for MLP, an image pattern is projected onto a plurality of principle component analysis (PCA) subspaces, and distances from the image pattern to the individual subspaces are used as inputs for MLP.

However, since a learning method using MLP just minimizes errors from given sample data, operations are satisfactorily performed with respect to the learned data, but successful operations cannot be secured with respect to new data that has not been learned. In particular, when considering various changes in a face image due to factors such as light, facial expression, and pose, the reliability of the methods based on MLP decreases if a large number of samples are not used in the training stage.

Conversely, an SVM minimizes errors in given data and maximizes the margin of the entire system, so it is more applicable to a new pattern as compared to the MLP. Although a conventional technique that directly applies an SVM to a face image results in a reliable face detection up to some degree, the technique is not satisfactory yet to be applied in real life. Another conventional technique that extracts the features of a face using independent component analysis (ICA) and applies an SVM to the face features has improved the reliability in detecting the face. However, since conventional techniques usually use a non-linear SVM in order to achieve a reliable face detection performance, a large amount of calculation causes the algorithms to perform slowly.

SUMMARY OF THE INVENTION

The present invention provides a method of training a pattern classifier using face patterns and near-face patterns in order to improve the reliability of the pattern classifier in detecting a face, and a method and system for detecting a face using the training method.

The present invention also provides a method of training a plurality of parallel pattern classifiers in order to improve the face detection speed, and a method and system for detecting a face using the training method.

According to an aspect of the present invention, there is provided a system for detecting a face using a pattern classifier for learning face images and near face images. The system includes a basis vector extractor, which receives a plurality of face images and a plurality of near-face images and extracts a plurality of face basis vectors expressing the face images and a plurality of near-face basis vectors expressing the near-face images; a feature vector extractor, which extracts face feature vectors and near-face feature vectors by projecting the face images and the near-face images upon the face and near-face feature vectors and projects an image, which is input for face detection, upon the basis vectors to extract a feature vector of the input image; a pattern classifier trainer, which trains the pattern classifier using the face feature vectors and the near-face feature vectors; and a face determiner, which applies the feature vector of the input image to the pattern classifier and determines whether the input image is a face image by using the pattern classifier.

According to another aspect of the present invention, there is provided a method of detecting a face using a pattern classifier for learning face images and near face images. The method includes (a) receiving a plurality of face images and a plurality of near-face images and extracting a plurality of face basis vectors expressing the face images and a plurality of near-face basis vectors expressing the near-face images; (b) extracting face feature vectors and near-face feature vectors by projecting the face images and the near-face images upon the face and near-face basis vectors; (c) training the pattern classifier with the face feature vectors and the near-face feature vectors; and (d) projecting an image, which is input for face detection, upon the basis vectors to extract a feature vector of the input image, applying the feature vector of the input image to the pattern classifier, and determining whether the input image is a face image using the pattern classifier.

According to still another aspect of the present invention, there is provided a system for detecting a face using a pattern classifier having learned face images and near face images. The system includes a basis vector extractor, which receives a plurality of face images and a plurality of near-face images and extracts a plurality of face basis vectors expressing the face images and a plurality of near-face basis vectors expressing the near-face images; a feature vector extractor, which extracts face feature vectors and near-face feature vectors by projecting the face images and the near-face images upon the face and near-face feature vectors and projects an image, which is input for face detection, upon the basis vectors to extract the feature vector of the input image; a clustering unit, which classifies the face feature vectors and the near-face feature vectors into predetermined sub-classes and outputs a subclass number of a sub-class including the feature vector of the input image among the sub-classes; a pattern classifier trainer, which trains each pattern classifier corresponding to a certain sub-class using face feature vectors and near-face feature vectors, which are included in the sub-class; and a face determiner, which applies the feature vector of the input image to the pattern classifier corresponding to the sub-class including the feature vector of the input image and determines whether the input image is a face image using the pattern classifier.

According to still another aspect of the present invention, there is provided a method of detecting a face using a pattern classifier having learned face images and near face images. The method includes (a) receiving a plurality of face images and a plurality of near-face images and extracting a plurality of face basis vectors expressing the face images and a plurality of near-face basis vectors expressing the near-face images; (b) extracting face feature vectors and near-face feature vectors by projecting the face images and the near-face images upon the face and near-face basis vectors; (c) classifying the face feature vectors and the near-face feature vectors into predetermined sub-classes; (d) training each pattern classifier corresponding to a certain sub-class using face feature vectors and near-face feature vectors, which are included in the sub-class; and (e) extracting a feature vector of an image, which is input for face detection, applying the feature vector of the input image to a pattern classifier corresponding to a sub-class including the feature vector of the input image, and determining whether the input image is a face image using the pattern classifier.

Preferably, step (e) includes (e1) projecting the input image upon the basis vectors to obtain feature values for the input image and extracting the feature vector of the input image using the feature values; (e2) determining the sub-class including the feature vector of the input image among the sub-classes; and (e3) applying the feature vector of the input image to the pattern classifier corresponding to the determined sub-class and determining whether the input image is a face image using the pattern classifier.

BRIEF DESCRIPTION OF THE DRAWINGS

The above and other aspects and advantages of the present invention will become more apparent by describing in detail preferred embodiments thereof with reference to the attached drawings in which.

DETAILED DESCRIPTION OF THE INVENTION

Hereinafter, preferred embodiments of the present invention will be described in detail with reference to the attached drawings. In the embodiments of the present invention, a support vector machine (SVM) is used as a pattern classifier.

Figure 1A:
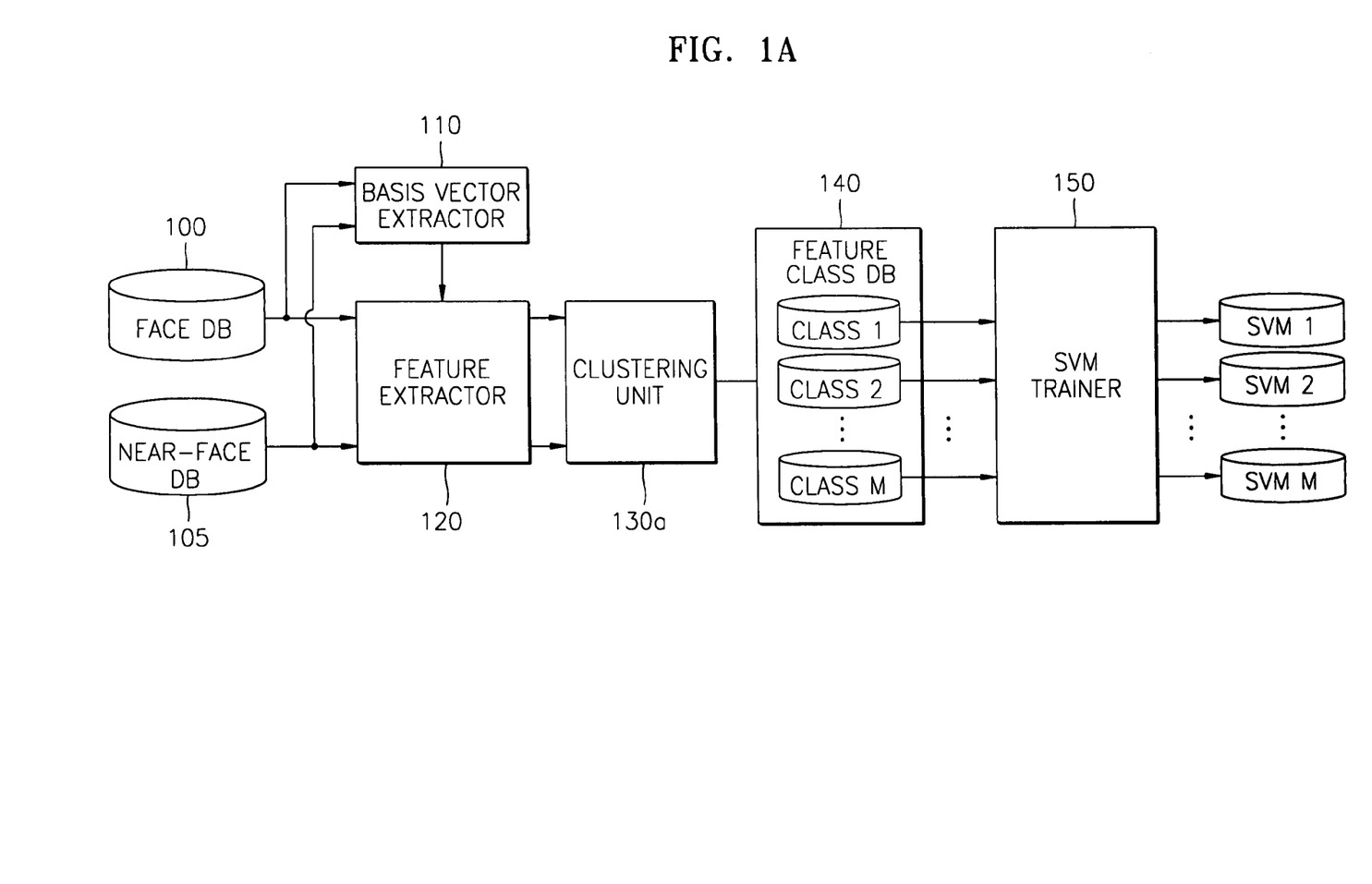
FIG. 1A is a block diagram of a pattern classifier training system of a face detection system according to a preferred embodiment of the present invention.

FIG. 1A is a block diagram of an SVM training system of a face detection system according to a preferred embodiment of the present invention. The SVM training system includes a face database (DB) 100 which stores face images; a near-face DB 105 which stores images having similar patterns to the face images; a basis vector extractor 110 which receives a plurality of images from the face DB 100 and the near-face DB 105 and extracts a plurality of basis vectors which express the plurality of images; a feature extractor 120 which projects a face image and a near-face image, which are stored in the face DB 100 and the near-face DB 105, upon the plurality of basis vectors in order to output feature vectors and residual errors for the respective feature vectors; a clustering unit 130a which classifies the features vectors received from the feature extractor 120 into predetermined sub-classes; a feature class DB 140 which stores feature vectors by sub-classes; and an SVM trainer 150 which trains SVMs using the feature vectors in the respective subclasses.

Figure 3A:
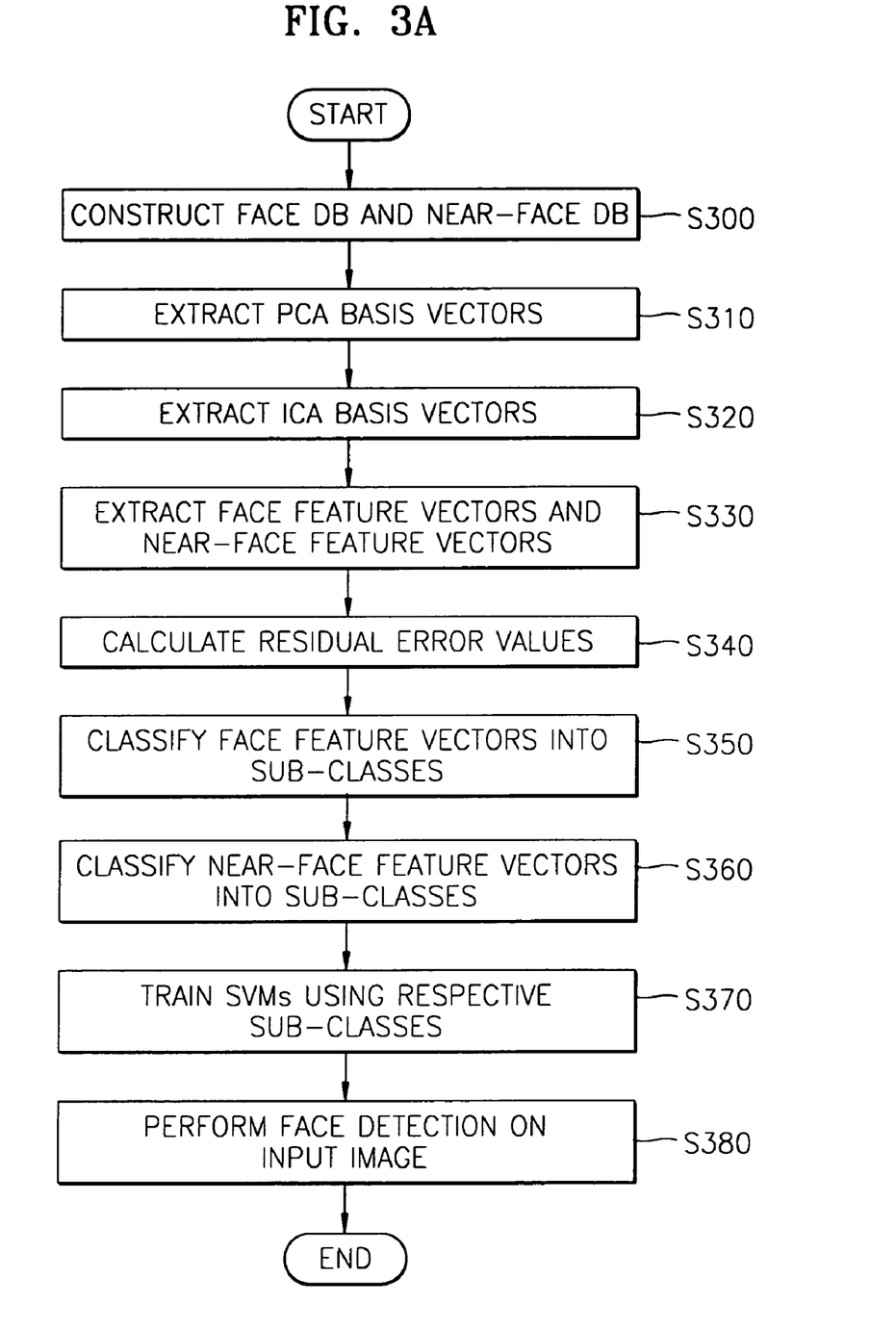
FIG. 3A is a flowchart of a method of detecting a face according to a preferred embodiment of the present invention.

A procedure for training SVMs and a face detection procedure of the present invention will be described with reference to FIG. 3A, which is a flowchart of a method of detecting a face according to a preferred embodiment of the present invention.

In operation S300, the face DB 100 is constructed by using many people's face images reflecting various facial expressions and lights, and the near-face DB 105 is constructed with a plurality of images having a similar pattern distance to the face images. Patterns other than a face are so various that modeling is nearly meaningless and is difficult. Accordingly, patterns that are not faces, but may cause errors because they are similar to the faces are collected as near-face samples. Various methods can be used to collect near-face sample. In the present invention, image patterns whose Euclidean distances from an average face image pattern are less than a predetermined value are initially collected to construct the near-face DB 105. After designing SVMs, non-face patterns, which were determined as being a face image in the face detection process, are collected as near-face samples and stored in the near-face DB 105 so that they are used to train the SVMs.

Figure 1B:
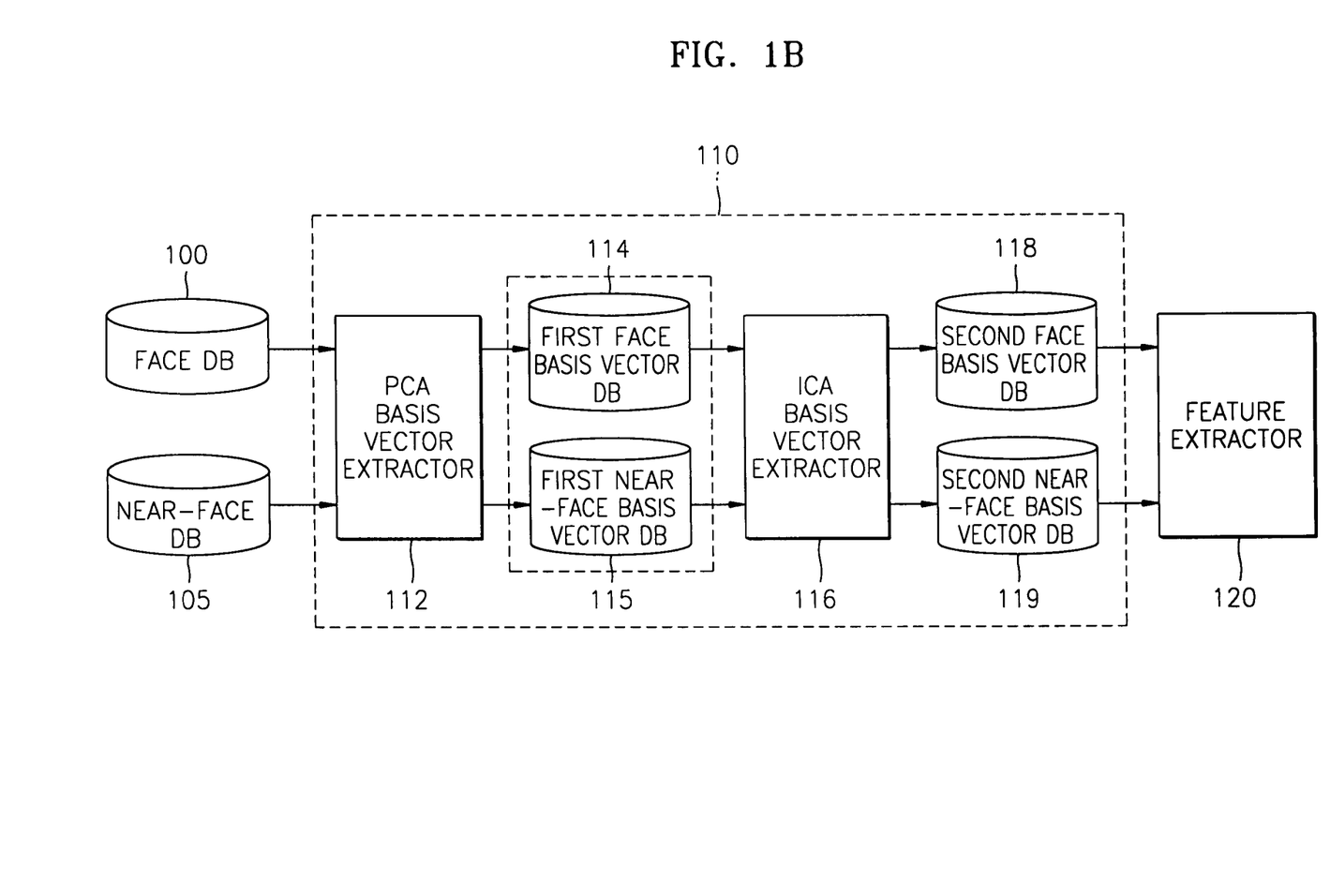
FIG. 1B is a detailed block diagram of the basis vector extractor shown in FIG. 1A.

In operations S310 and S320, the basis vector extractor 110 receives the images stored in the face DB 100 and the near-face DB 105 and extracts basis vectors from the respective images. Referring to FIG. 1B, the basis vector extractor 110 includes a principle component analysis (PCA) basis vector extractor 112 which extracts PCA basis vectors by performing PCA on each input image; a first face basis vector DB 114 and a first near-face basis vector DB 115 which store the PCA basis vectors; an independent component analysis (ICA) basis vector extractor 116 which performs ICA on each of the basis vectors received from the first face basis vector DB 114 and the first near-face basis vector DB 115 in order to output ICA basis vectors; and a second face basis vector DB 118 and a second near-face basis vector DB 119 which store the ICA basis vectors.

In operation S310, the PCA basis vector extractor 112 of the basis vector extractor 110 receives the face images output from the face DB 100 and then performs PCA on the face images to extract PCA basis vectors. The PCA basis vector extractor 112 normalizes the position and size of each face image using the coordinates of the eyes of the face image. Thereafter, the PCA basis vector extractor 112 performs PCA in order to output the PCA basis vectors, each of which can express a face space. In operation S310, the PCA basis vector extractor 112 also performs PCA on the near-face images received from the near-face DB 105 in order to extract basis vectors from near-face spaces.

Figure 4A:
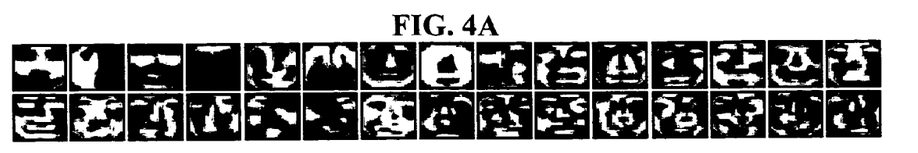
FIGS. 4A through 4D show images corresponding to basis vectors that are extracted according to a preferred embodiment of the present invention.
Figure 4B:
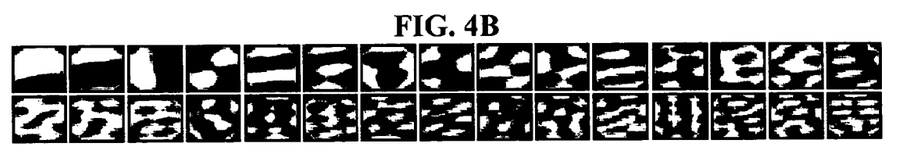

FIG. 4A shows images corresponding to PCA basis vectors of 30 face images, while FIG. 4B shows images corresponding to PCA basis vectors of 30 near-face images.

The PCA basis vectors extracted from the face images are stored in the first face basis vector DB 114, and the PCA basis vectors extracted from the near-face images are stored in the first near-face basis vector DB 115. Among the PCA basis vectors stored in each of the DBs 114 and 115, N PCA basis vectors having a largest eigen value are output to the ICA basis vector extractor 116. Alternatively, it is possible to directly output the PCA basis vectors from the PCA basis vector extractor 112 to the ICA basis vector extractor 116 without storing the PCA basis vectors in the DBs 114 and 115.

In operation S320, the ICA basis vector extractor 116 performs ICA on the face PCA basis vectors and the near-face PCA basis vectors in order to extract the ICA basis vectors.

In conventional systems and methods for training an SVM, only PCA which considers the $2^{nd}$-order relationship between adjacent pixels in an image is used. However, the present invention also performs ICA on PCA basis vectors to extract ICA basis vectors so that a relationship between pixels that are not adjacent can be expressed, thereby achieving the higher-order statistics of images. The extracted ICA vectors provide superior performance for expressing a face to the PCA vectors.

Figure 4C:
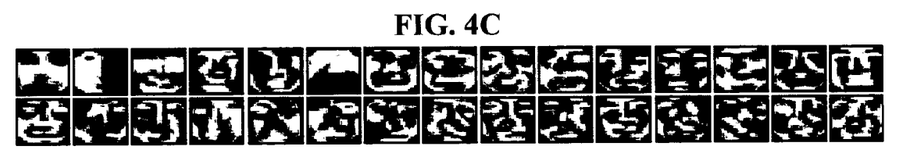
Figure 4D:
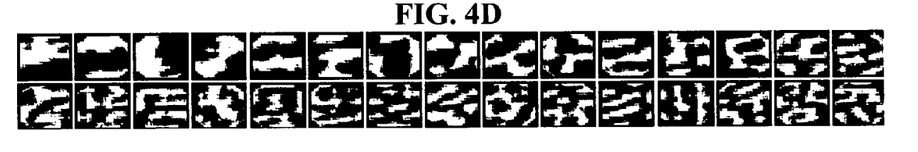

FIG. 4C shows images corresponding to ICA basis vectors of 30 face images, while FIG. 4B shows images corresponding to ICA basis vectors of 30 near-face images.

The face basis vectors and near-face basis vectors extracted by the basis vector extractor 110 are output to the feature extractor 120 to be used to extract feature vectors from each of the face and near-face images.

Figure 1C:
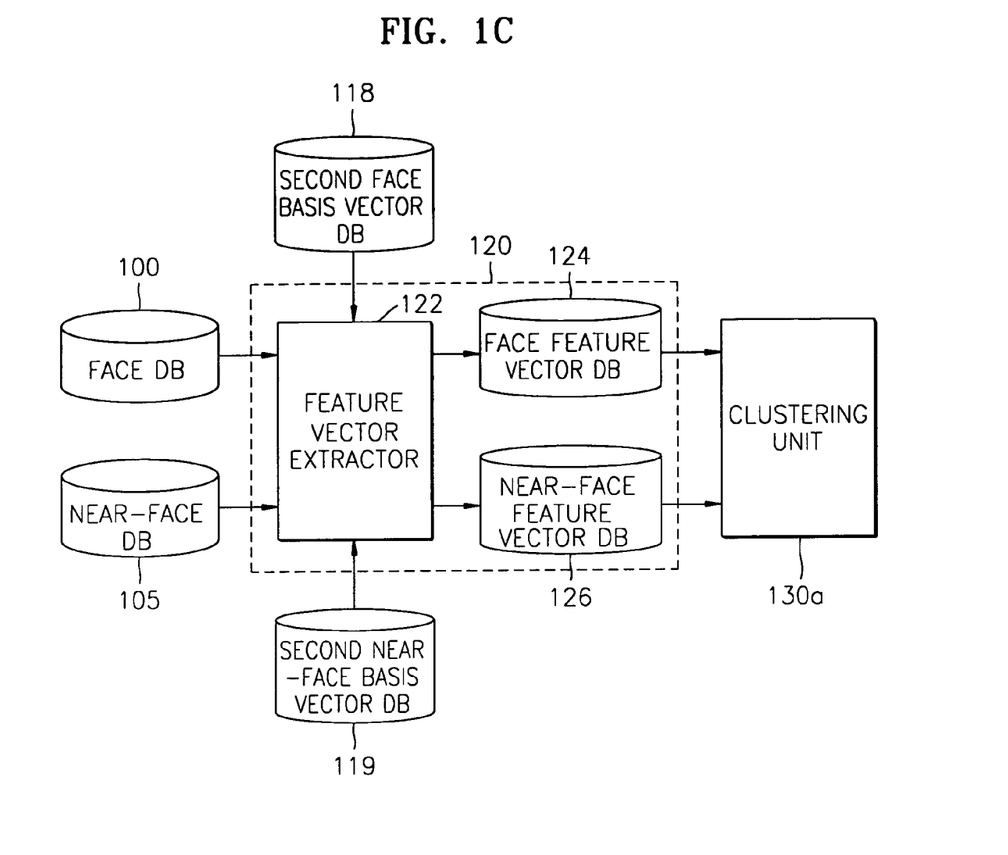
FIG. 1C is a detailed block diagram of the feature extractor shown in FIG. 1A.

Referring to FIG. 1C, the feature extractor 120 includes a feature vector extractor 122 which extracts face feature vectors and near-face feature vectors, a face feature vector DB 124 which stores the face feature vectors, and a near-face feature vector DB 126 which stores the near-face feature vectors.

In operation S330, the feature vector extractor 122 projects each of the face images from the face DB 100 and each of the near-face images from the near-face DB 105 upon the face basis vectors and the near-face basis vectors, which are output from the basis vector extractor 110, in order to extract face feature vectors and near-face feature vectors, each of which is composed of coefficients and residual errors for each basis vector.

Specifically, the feature vector extractor 122 projects a face image upon the N face basis vectors extracted from the face images in order to extract N feature values (projection coefficients) and projects the face image upon the N near-face basis vectors extracted from the near-face images in order to extract N feature values, thereby extracting a total of 2N feature values for the face image. Similarly, the feature vector extractor 122 projects a near-face image upon the N face basis vectors in order to extract N feature values and projects the near-face image upon the N near-face basis vectors in order to extract N feature values, thereby extracting a total of 2N feature values for the near-face image.

In operation S340, the feature vector extractor 122 calculates residual errors as additional feature values used to train an SVM. A residual error indicates a distance between the vector of an image, which is restored by multiplying feature values (projection coefficients) extracted by projecting each image upon the N basis vectors by the respective N basis vectors, and the real vector of the image before projection. When a face image is restored using the N face basis vectors, the residual error is small. However, when a near-face image is restored using the N face basis vectors, the residual error is large. Conversely, when a face image is restored using the N near-face basis vectors, the residual error is large. However, when a near-face image is restored using the N near-face basis vectors, the residual error is small.

Figure 5:
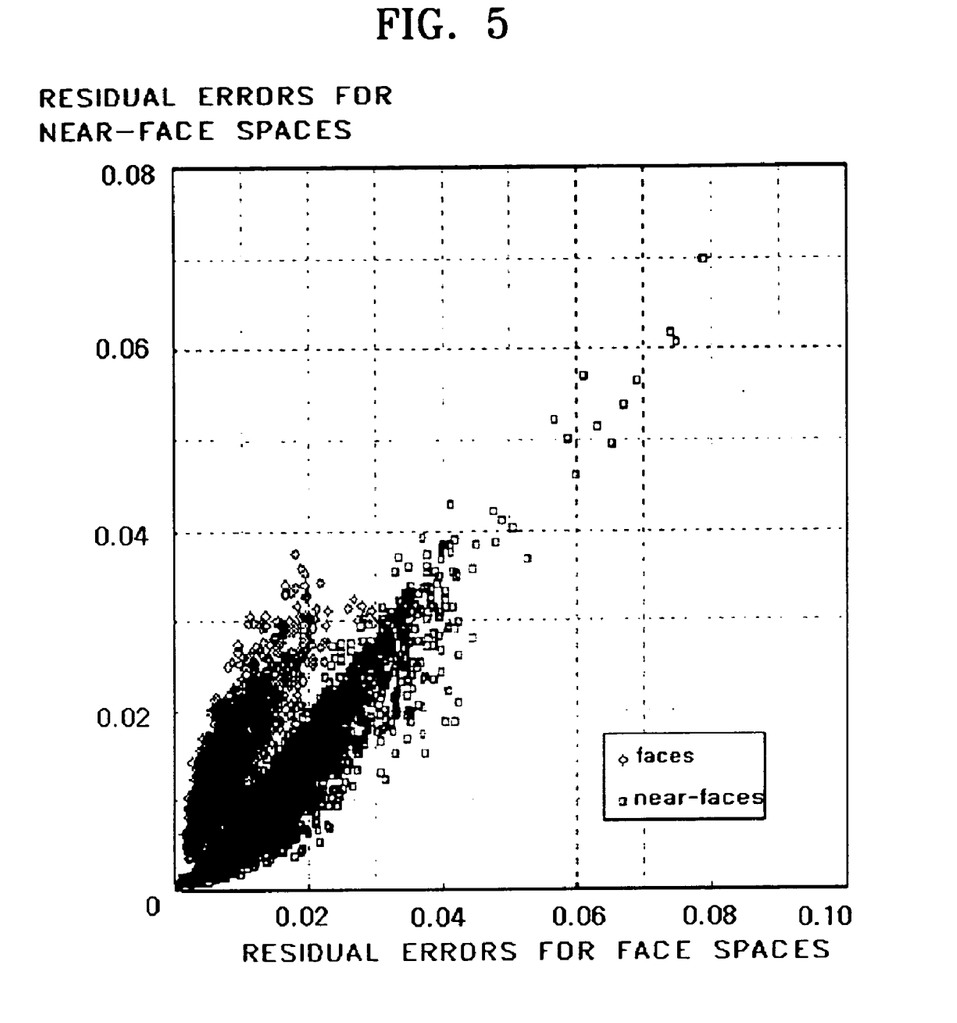
FIG. 5 is a graph of residual errors calculated according to a preferred embodiment of the present invention.

FIG. 5 is a graph of residual errors with respect to face and near-face images which are used for training. As shown in FIG. 5, when residual errors with respect to both face image and near-face image are used, a class can be roughly identified by only two residual errors. Accordingly, to increase the reliability of an SVM, the present invention uses the 2N feature values and two residual errors in order to extract a feature vector for discriminating a face from a near-face.

Consequently, the feature vector extractor 122 extracts a single feature vector using 2N+2 feature values that are obtained for a single image and stores feature vectors for the face images in the face feature vector DB 124 and feature vectors for the near-face images in the near-face feature vector DB 126 before outputting the feature vectors to the clustering unit 130a.

In operation S350, the clustering unit 130a classifies the face feature vectors into predetermined sub-classes and selects a central face feature vector representing each sub-class.

The present invention classifies face feature vectors into a plurality of subclasses using a "k-means clustering" algorithm. Here, the number of sub-classes is variable. The clustering unit 130a measures a Euclidean distance among the face feature vectors using the k-means clustering algorithm, classifies the face feature vectors into the predetermined sub-classes by grouping face feature vectors in accordance with the Euclidean distance so that face feature vectors which are close to one another in terms of the Euclidean distance belong to the same sub-class, and stores the classified face feature vectors in the feature class DB. Thereafter, the clustering unit 130a selects a face feature vector, which is closest to an average of the face feature vectors stored in each sub-class, as a central face feature vector representing the sub-class.

Figure 6:
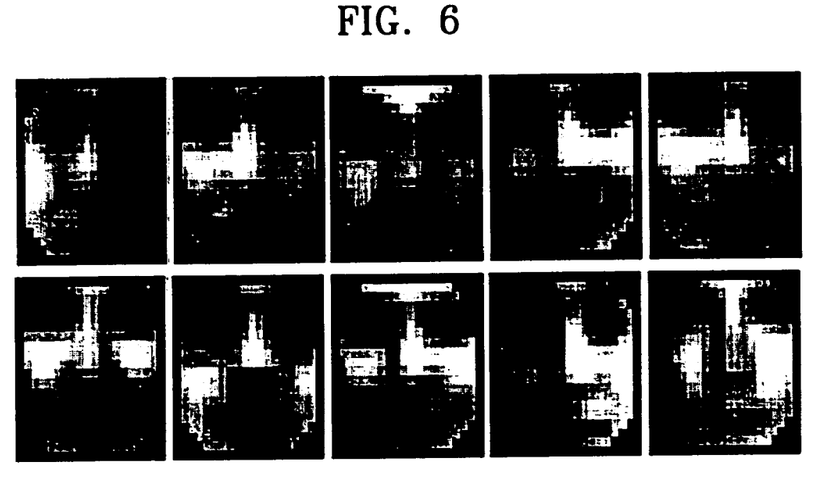
FIG. 6 shows images corresponding to central face feature vectors of respective sub-classes according to a preferred embodiment of the present invention.

FIG. 6 shows images corresponding to central face feature vectors of 10 respective sub-classes into which face feature vectors are classified. There is no considerable difference among the images, but the images are a little different with respect to light, facial expression, and degree of rotation.

In operation S360, the clustering unit 130a classifies the near-face feature vectors into the predetermined sub-classes, into which face feature vectors are classified. Specifically, the clustering unit 130a measures a Euclidean distance between each of the near-face feature vectors and the central face feature vectors of the respective sub-classes and allocates each near-face feature vector to a subclass that is closest to the near-face feature vector in terms of the Euclidean distance. Accordingly, the predetermined sub-classes including face feature vectors and near-face feature vectors are obtained.

Thereafter, the SVM trainer 150 trains SVMs 1 through M using corresponding sub-classes, each of which includes face feature vectors and near-face feature vectors, in operation S370.

Figure 7:
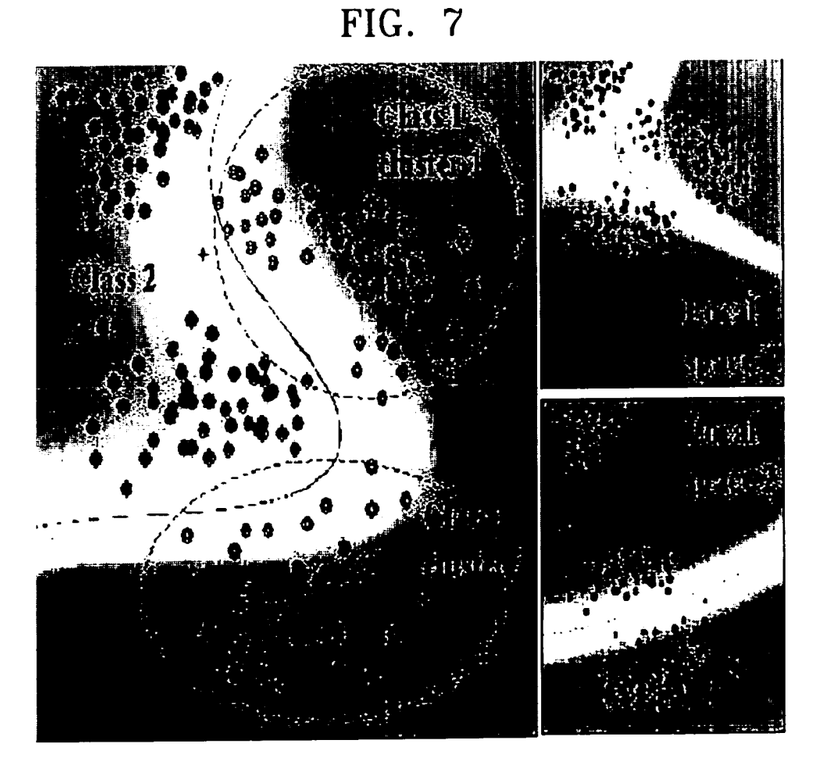
FIG. 7 is a diagram for explaining a procedure for training a pattern classifier according to a preferred embodiment of the present invention.

Referring to FIG. 7, a class 1 denotes a face feature vector, and a class 2 denotes a near-face feature vector. As shown in FIG. 7, since face and near-face classes have a large number of various feature vectors, the distribution of feature vectors is not easily expressed by a single dispersion around a single center, but the feature vectors are non-uniformly distributed. Accordingly, when it is necessary to identify a complex class using a single decision boundary, calculation is very complicated, consuming a significant amount of time. In addition, it is difficult to obtain a reliable decision boundary by training an SVM.

Accordingly, as shown in the upper and down right portions of FIG. 7, the present invention classifies an entire class into the above-described predetermined sub-classes and trains SVMs using the face feature vectors and the near-face feature vectors by the sub-classes, thereby remarkably reducing the amount of calculation necessary for learning. Therefore, fast and reliable boundary decision can be accomplished.

After the SVMs according to the present invention finish learning through the above-described procedure, if an image is input, face detection is performed on the input image using the learning SVMs in operation S380.

Figure 2:
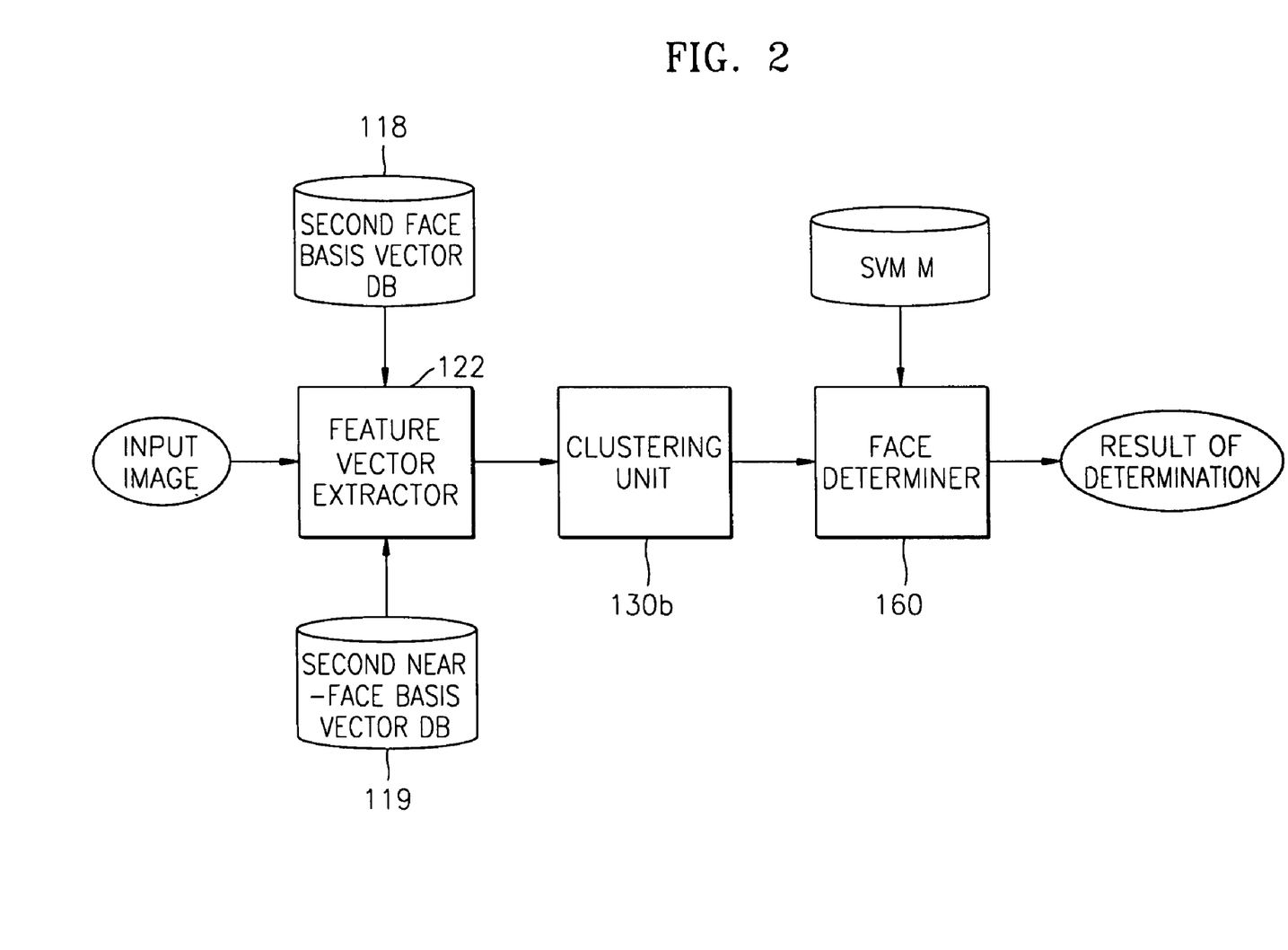
FIG. 2 is a schematic block diagram of a face detection system according to a preferred embodiment of the present invention.
Figure 3B:
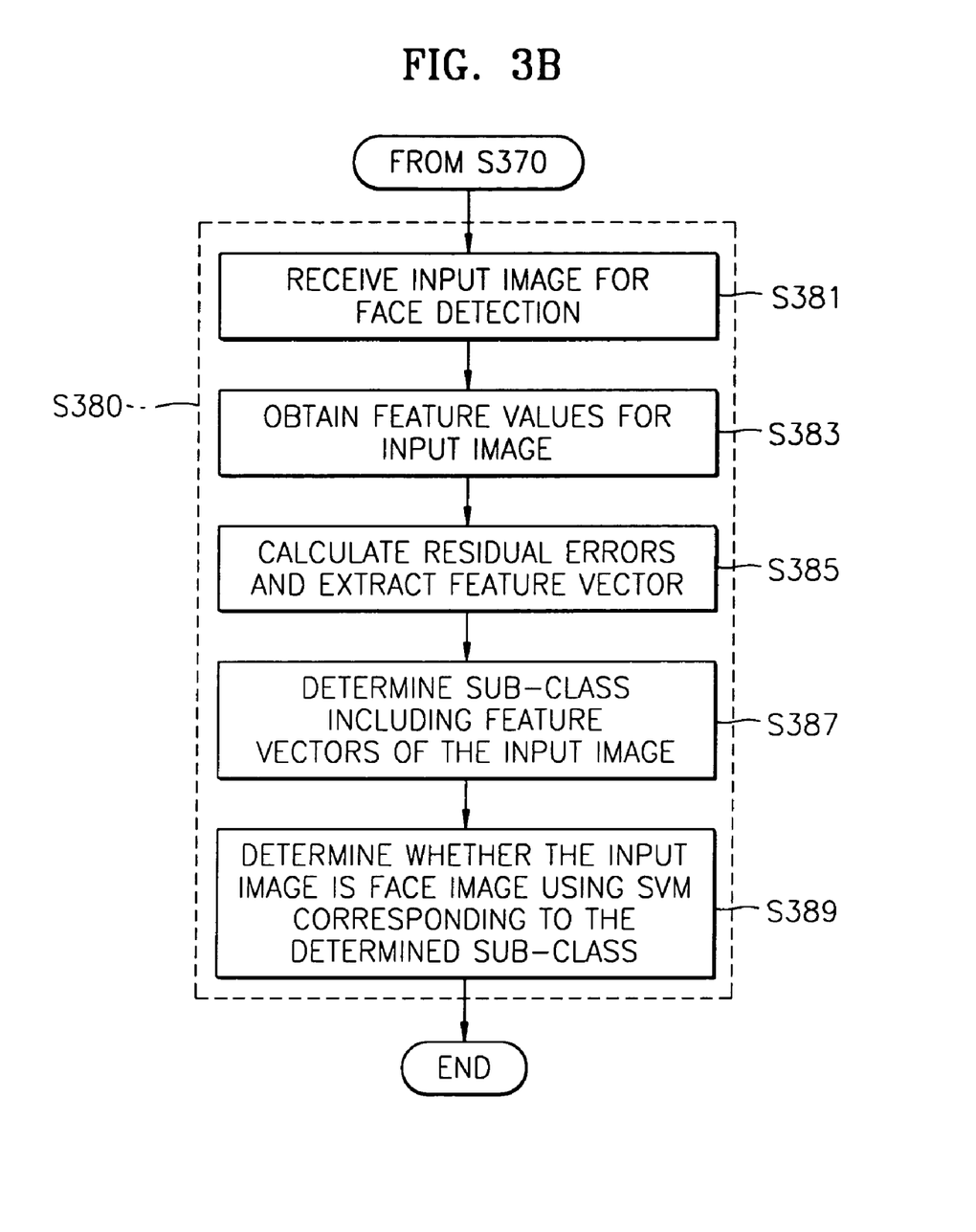
FIG. 3B is a detailed flowchart of operation S380 shown in FIG. 3A.

Hereinafter, a face detection procedure will be described with reference to FIG. 2, which is a schematic block diagram of a face detection system according to the present invention, and FIG. 3B, which is a detailed flowchart of operation S380.

In operation S381, a feature vector extractor 122 receives an image input for face detection. The feature vector extractor 122 has the same functions as the feature vector extractor 122 shown in FIG. 1C. Accordingly, in operation S383, the feature vector extractor 122 projects the input image upon the N face basis vectors and N near-face basis vectors received from the basis vector extractor 110, thereby obtaining 2N feature values.

In operation S385, the feature vector extractor 122 calculates residual errors with respect to the input image in the same manner as used in operation S340, extracts a single feature vector using the 2N feature values (projection coefficients) and two residual errors, and outputs the feature vector to a clustering unit 130b.

In operation S387, the clustering unit 130b measures a Euclidean distance between the feature vector of the input image and the central face feature vectors of the respective sub-classes, determines a sub-class, which includes a central face feature vector having the least Euclidean distance, as a sub-class including the input image, and outputs the sub-class number to a face determiner 160.

In operation S389, the face determiner 160 applies the feature vector of the input image to one of the SVMs 1 through M corresponding to the sub-class number and determines whether a pattern shown in the input image is a face.

Figure 8:
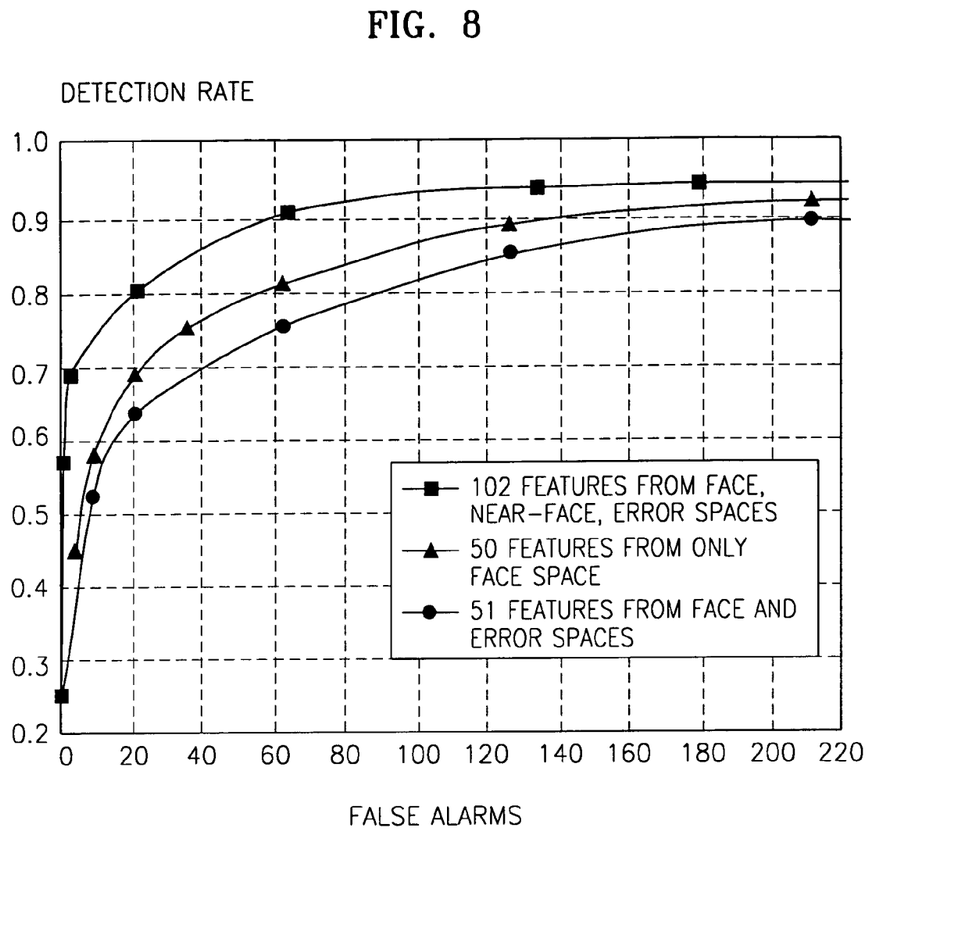
FIG. 8 is a graph of detection rates of different pattern classifiers according to a preferred embodiment of the present invention.

The resulting data after performing face detection using pattern classifiers that learned according to the above-described method and system is shown in Table 1 and FIG. 8.

In the training, near-face images were initially selected by matching an average template for a face and then enlarged by a bootstrap method. In the test, two image sets A and B were used as input images for face detection. The set A was composed of 400 high quality images, each of which contains a single face and was extracted from an Olivetti image DB. The set B was composed of 36 images having various image qualities. The 36 images contained a total of 172 face images as a whole and were extracted from a Rowley image DB.

To detect a face image from an input image, a pattern classifier according to the present invention determined whether there was a face image in observation windows in all possible positions and all possible scales.

TABLE 1

| | Set A | | Set B | |
|---|---|---|---|---|
| | Detection rate | False alarm | Detection rate | False alarm |
| Prior art | 97.2% | 3 | 84.3% | 127 |
| Present invention | 98.5% | 4 | 90.1% | 62 |

For prior art, face detection was performed using a pattern classifier, which learned 50 ICA feature values extracted from each face image. For the present invention, face detection was performed using a pattern classifier, which learned 50 feature values extracted from each face image, 50 feature values extracted from each near-face image, and two residual errors. As shown in Table 1 and FIG. 8 which shows the detection rate with respect to set B, the face detection rate remarkably increased in the present invention.

Table 2 shows the results of testing the face detection performances with respect to set B when a single pattern classifier learned face and near-face feature vectors, and when the face and near-face feature vectors were classified into predetermined sub-classes and then learned by a plurality of parallel pattern classifiers.

TABLE 2

| | Margin | Number of support vectors | Detection rate |
|---|---|---|---|
| Single classifier | 0.2158 | 439 | 93.5% |
| Parallel classifiers | 0.5945 | 119 | 93.5% |

As shown in Table 2, since the parallel pattern classifiers had more margin than the single pattern classifier, they had a lower detection error rate. Accordingly, the parallel pattern classifiers had a 3.7 times faster detection speed than the single pattern classifier since the parallel pattern classifiers have smaller support vectors.

The present invention can be realized as a code which is recorded on a computer readable recording medium and can be read by a computer. The computer readable recording medium may be any type on which data which can be read by a computer system can be recorded, for example, a ROM, a RAM, a CDROM, a magnetic tape, a floppy disc, or an optical data storage device. The present invention can also be realized as carrier waves (for example, transmitted through Internet). Alternatively, computer readable recording media may be distributed among computer systems connected through a network so that the present invention can be realized as a code which is stored in the recording media and can be read and executed in computers.

According to the present invention, near-face images as well as face images are used as learning data by a pattern classifier, so the problems of the prior art determining a face image having different light or facial expression from learned data, as not a face or determining a non-face pattern similar to a face as a face can be remarkably reduced. In addition, since the present invention uses both PCA and ICA for learning of a pattern classifier instead of using only the PCA, which is conventionally used, detection performances can be increased. Moreover, face learning and detection performances can be remarkably increased by using residual errors as feature values expressing features of face and near face images. In addition, unlike conventional technology using a single pattern classifier learning feature vectors, the present invention uses a plurality of pattern classifiers arranged in parallel, thereby effectively expressing a decision boundary with a small number of support vectors and obtaining more margin than the conventional technology. Consequently, the present invention provides high reliability. Moreover, the present invention remarkably reduces the amount of calculation for a decision boundary, thereby greatly increasing a speed of determining whether a new pattern is a face.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of detecting a face using a pattern classifier having learned face images and near-face images, the method comprising the steps of:
    (a) receiving a plurality of face images and a plurality of near-face images and extracting a plurality of face basis vectors expressing the face images and a plurality of near-face basis vectors expressing the near-face images;
    (b) extracting face feature vectors and near-face feature vectors by projecting the face images and the near-face images upon the face and near-face basis vectors;
    (c) classifying the face feature vectors and the near-face feature vectors into a plurality of predetermined sub-classes;
    (d) training a plurality of pattern classifiers that correspond to the plurality of predetermined sub-classes, wherein the pattern classifier corresponding to a certain sub-class is trained using the face feature vectors and near-face feature vectors, which are included in the sub-class; and
    (e) extracting a feature vector of an image, which is input for face detection, applying the feature vector of the input image to only one pattern classifier of the plurality of pattern classifiers, wherein the one pattern classifier corresponds to the sub-class including the feature vector of the input image, and determining whether the input image is a face image using the pattern classifier.

2. The method of claim 1, wherein step (e) comprises the steps of:
    (e1) projecting the input image upon the basis vectors to obtain feature values for the input image and extracting the feature vector of the input image using the feature values;
    (e2) determining the sub-class including the feature vector of the input image among the sub-classes; and
    (e3) applying the feature vector of the input image to the pattern classifier corresponding to the determined sub-class and determining whether the input image is a face image using the pattern classifier.

3. The method of claim 2, wherein step (e1) comprises calculating a residual error representing a difference between the input image and a restored value obtained by multiplying projection coefficients, which are obtained by projecting the input image upon the face basis vectors and the near-face basis vectors, by the basis vectors, and extracting the feature vector of the input image using the projection coefficients and the residual error.

4. The method of claim 1, wherein step (a) comprises the steps of:
    (a1) performing a principle component analysis (PCA) on the plurality of face images and the plurality of near-face images to extract face PCA basis vectors for the face images and near-face PCA basis vectors for the near-face images; and
    (a2) performing an independent component analysis (ICA) on the face and near-face PCA basis vectors and outputting face ICA basis vectors as the face basis vectors and near-face ICA basis vectors as the near-face basis vectors.

5. The method of claim 4, wherein step (a) further comprises storing the face basis vectors and the near-face basis vectors.

6. The method of claim 1, wherein step (b) comprises the steps of:
    (b1) projecting the face images and the near-face images upon the basis vectors to obtain projection coefficients;
    (b2) calculating residual errors representing differences between a restored value obtained by multiplying the projection coefficients by the basis vectors and each of the face and near-face images; and
    (b3) extracting the feature vectors of the face and near-face images using the projection coefficients and residual errors.

7. The method of claim 1, wherein step (c) comprises the steps of:
    (c1) measuring a Euclidean distance with respect to each of the face feature vectors and classifying the face feature vectors into the predetermined sub-classes by grouping face feature vectors in accordance with the Euclidean distance, so that face feature vectors which are close to one another in terms of the Euclidean distance belong to the same sub-class; and
    (c2) selecting a central face feature vector from face feature vectors belonging to each of the sub-classes according to an average of the face feature vectors.

8. The method of claim 7, wherein step (c) further comprises measuring a Euclidean distance between the near-face feature vectors and each central face feature vector and classifying the near-face feature vectors into the predetermined sub-classes by grouping near-face feature vectors in accordance with the Euclidean distance so that near-face feature vectors which are close to a predetermined central face feature vector in terms of the Euclidean distance belong to a sub-class including the predetermined central face feature vector.

9. The method of claim 1, wherein step (c) comprises classifying the face feature vectors into the predetermined sub-classes using a k-means clustering algorithm.

10. A program on a tangible computer-readable recording medium which can be executed on a computer to carry out a method of claim 1.

11. A system for detecting a face using a pattern classifier having learned face images and near face images, the system comprising:
    a basis vector extractor, which receives a plurality of face images and a plurality of near-face images and extracts a plurality of face basis vectors expressing the face images and a plurality of near-face basis vectors expressing the near-face images;
    a feature vector extractor, which extracts face feature vectors and near-face feature vectors by projecting the face images and the near-face images upon the face and near-face feature vectors and projects an image, which is input for face detection, upon the basis vectors to extract the feature vector of the input image;

a clustering unit, which classifies the face feature vectors and the near-face feature vectors into a plurality of predetermined sub-classes and outputs a sub-class number of a sub-class including the feature vector of the input image among the sub-classes;

a pattern classifier trainer, which trains a plurality of pattern classifiers that correspond to the plurality of predetermined sub-classes, wherein the pattern classifier corresponding to a certain sub-class is trained using the face feature vectors and near-face feature vectors, which are included in the sub-class; and a face determiner, which applies the feature vector of the input image to only one pattern classifier of the plurality of pattern classifiers, wherein the one pattern classifier corresponds to the sub-class number including the feature vector of the input image and determines whether the input image is a face image using the pattern classifier.

12. The system of claim 11, wherein the basis vector extractor comprises:

a principle component analysis (PCA) basis vector extractor, which performs PCA on the plurality of face images and the plurality of near-face images to extract face PCA basis vectors for the face images and near-face PCA basis vectors for the near-face images; and an independent component analysis (ICA) basis vector extractor, which performs ICA on the face and near-face PCA basis vectors and outputs the face basis vectors and the near-face basis vectors.

13. The system of claim 12, wherein the basis vector extractor further comprises:

a face basis vector storage unit, which stores the face basis vectors; and a near-face basis vector storage unit for storing the near-face basis vectors.

14. The system of claim 11, wherein the feature vector extractor:

obtains projection coefficients by projecting the face images, the near-face images, and the input image upon the face basis vectors and the near-face basis vectors;

obtains residual errors representing differences between each of the face images, the near-face images, and the input image and a restored value, which is obtained by multiplying the projection coefficients by the basis vectors; and extracts the face feature vectors, the near-face feature vectors, and the feature vector of the input image using the projection coefficients and the residual errors.

15. The system of claim 11, wherein the clustering unit:

measures a Euclidean distance with respect to each of the face feature vectors;

classifies the face feature vectors into the predetermined sub-classes by grouping face feature vectors in accordance with the Euclidean distance, so that face feature vectors which are close to one another in terms of Euclidean distance belong to the same sub-class; and selects a central face feature vector from face feature vectors belonging to each of the sub-classes according to an average of the face feature vectors.

16. The system of claim 15, wherein the clustering unit measures a Euclidean distance between the near-face feature vectors and each central face feature vector and classifies the near-face feature vectors into the predetermined sub-classes by grouping near-face feature vectors in accordance with the Euclidean distance, so that near-face feature vectors which are close to a predetermined central face feature vector in terms of the Euclidean distance belong to a sub-class including the predetermined central face feature vector.

17. The system of claim 15, wherein the clustering unit measures a Euclidean distance between the feature vector of the input image and each central face feature vector and allocates the feature vector of the input image to a sub-class, which includes the central face feature vector that is closest to the feature vector of the input image.

18. The system of claim 15, wherein the clustering unit classifies the face feature vectors into the predetermined sub-classes using a k-means clustering algorithm.

* * * * *